United States Patent
Kawai et al.

(10) Patent No.: US 11,502,307 B2
(45) Date of Patent: Nov. 15, 2022

(54) MANUFACTURING METHOD OF GAS DIFFUSION LAYER WITH MICROPOROUS LAYER, AND MANUFACTURING METHOD OF FUEL CELL

(71) Applicants: TOYOTA JIDOSHA KABUSHIKI KAISHA, Toyota (JP); TOHO TITANIUM CO., LTD., Kanagawa (JP)

(72) Inventors: Hiroyuki Kawai, Toyota (JP); Yosuke Inoue, Chigasaki (JP)

(73) Assignees: Toyota Jidosha Kabushiki Kaisha, Toyota (JP); Toho Titanium Co., Ltd., Chigasaki (JP)

( * ) Notice: Subject to any disclaimer, the term of this patent is extended or adjusted under 35 U.S.C. 154(b) by 35 days.

(21) Appl. No.: 17/022,297

(22) Filed: Sep. 16, 2020

(65) Prior Publication Data
US 2021/0184224 A1    Jun. 17, 2021

(30) Foreign Application Priority Data
Dec. 11, 2019   (JP) .............................. JP2019-223687

(51) Int. Cl.
H01M 4/88    (2006.01)

(52) U.S. Cl.
CPC ....... *H01M 4/8807* (2013.01); *H01M 4/8882* (2013.01)

(58) Field of Classification Search
None
See application file for complete search history.

(56) References Cited

U.S. PATENT DOCUMENTS

| | | | |
|---|---|---|---|
| 2005/0112449 A1* | 5/2005 | Mathias | H01M 8/0234 429/480 |
| 2006/0057452 A1* | 3/2006 | Kim | H01M 4/8657 429/480 |

FOREIGN PATENT DOCUMENTS

| | | |
|---|---|---|
| JP | 2007-194004 A | 8/2007 |
| JP | 2015-218207 A | 12/2015 |

OTHER PUBLICATIONS

JP2007194004—machine translation by ProQuest (Year: 2007).*

* cited by examiner

*Primary Examiner* — Haroon S. Sheikh
(74) *Attorney, Agent, or Firm* — Finnegan, Henderson, Farabow, Garrett & Dunner, LLP

(57) ABSTRACT

A manufacturing method of a gas diffusion layer with a microporous layer includes coating a gas diffusion layer containing titanium with a precursor containing an electroconductive material, a water-repellent resin, and a polyethylene oxide, and heating the gas diffusion layer coated with the precursor to form a microporous layer containing the electroconductive material and the water-repellent resin on a surface of the gas diffusion layer. The heating atmosphere is a non-oxidation atmosphere where an oxygen concentration is no more than 0.3% by volume.

12 Claims, 4 Drawing Sheets

MANUFACTURING METHOD OF GAS DIFFUSION LAYER WITH MICROPOROUS LAYER, AND MANUFACTURING METHOD OF FUEL CELL

CROSS-REFERENCE TO RELATED APPLICATION

This application claims priority to Japanese Patent Application No. 2019-223687 filed on Dec. 11, 2019, incorporated herein by reference in its entirety.

BACKGROUND

1. Technical Field

The application discloses a method of depositing a microporous layer on a surface of a gas diffusion layer to manufacture a gas diffusion layer with a microporous layer, and a method of manufacturing a fuel cell using the gas diffusion layer with the microporous layer.

2. Description of Related Art

Fuel cells such as polymer electrolyte membrane fuel cells (PEFC) and so forth use a gas diffusion layer with a microporous layer, where a microporous layer containing electroconductive material and water-repellent resin is deposited on a gas diffusion layer formed of an electroconductive porous material. In such fuel cells, anode gas or cathode gas is diffused to a catalyst layer via the gas diffusion layer with the microporous layer.

A gas diffusion layer with a microporous layer can be manufactured by coating the surface of a gas diffusion layer with a precursor containing an electroconductive material, a water-repellent resin, and a dispersant, following which the dispersant is removed (degreased) from the precursor by heating, as disclosed in Japanese Unexamined Patent Application Publication No. 2007-194004 (JP 2007-194004 A) and Japanese Unexamined Patent Application Publication No. 2015-218207 (JP 2015-218207 A), for example. A porous material made of carbon is commonly used for the gas diffusion layer. When removing the dispersant from the precursor by heating, the removal is commonly performed by decomposition of the dispersant into carbon dioxide and water, in a heating atmosphere that is an oxygen-bearing atmosphere.

SUMMARY

There is a problem that realization of both rigidity and gas diffusivity is difficult with a gas diffusion layer made of carbon. One idea that can be conceived to solve this issue is to employ a gas diffusion layer containing titanium. However, according to new understanding gained by the present inventor, providing a microporous layer on a gas diffusion layer containing titanium in the same way as in a conventional method may lead to marked increase of electrical resistance (volume resistivity).

A first aspect of the disclosure relates to a manufacturing method of a gas diffusion layer with a microporous layer. The method includes coating a gas diffusion layer containing titanium with a precursor containing an electroconductive material, a water-repellent resin, and a polyethylene oxide, and heating the gas diffusion layer coated with the precursor in a non-oxidation atmosphere where an oxygen concentration is no more than 0.3% by volume to form a microporous layer containing the electroconductive material and the water-repellent resin on a surface of the gas diffusion layer.

In the manufacturing method according to the disclosure, a heating temperature may be no lower than 350° C. and no higher than 400° C.

In the manufacturing method according to the disclosure, the non-oxidation atmosphere may be an inert gas atmosphere where the oxygen concentration is no more than 0.3% by volume.

The manufacturing method according to the disclosure may further include subjecting the gas diffusion layer to water-repelling treatment, prior to coating the gas diffusion layer with the precursor.

A second aspect of the disclosure relates to a manufacturing method of a fuel cell. The method includes disposing a catalyst layer on a microporous layer side of the gas diffusion layer with the microporous layer manufactured by the manufacturing method according to the first aspect, and disposing a separator on a gas diffusion layer side of the gas diffusion layer with the microporous layer.

According to the manufacturing method of the disclosure, increase in electrical resistance (volume resistivity) can be suppressed as compared to conventionally, when providing a microporous layer on the surface of a gas diffusion layer containing titanium.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Manufacturing Method of Gas Diffusion Layer with Microporous Layer

Figure 1:
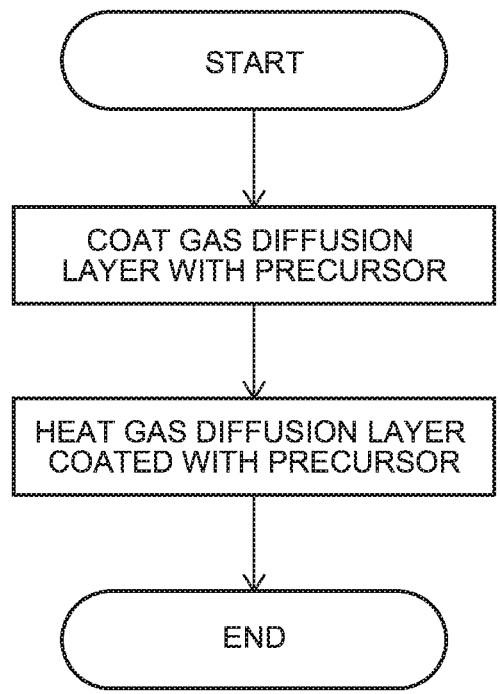
FIG. 1 is a diagram for describing an example of a manufacturing method of a gas diffusion layer with a microporous layer.
Figure 2:
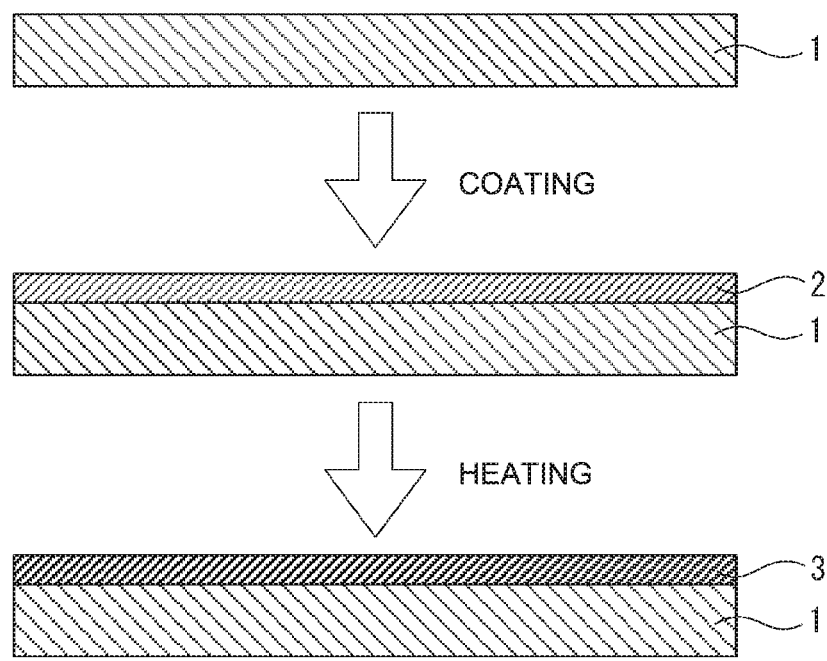
FIG. 2 is a diagram for describing the example of the manufacturing method of the gas diffusion layer with the microporous layer.

FIGS. 1 and 2 illustrate an example of a manufacturing method of a gas diffusion layer with a microporous layer. The manufacturing method illustrated in FIGS. 1 and 2 include coating a precursor 2 containing an electroconductive material, a water-repellent resin, and a polyethylene oxide, on a gas diffusion layer 1 containing titanium, and heating the gas diffusion layer 1 upon which the precursor 2 has been coated to form a microporous layer 3 containing the electroconductive material and the water-repellent resin on the surface of the gas diffusion layer 1. In the manufacturing method of the disclosure, the atmosphere for heating here is a non-oxidation atmosphere where the oxygen concentration is no more than 0.3% by volume.

1.1 Gas Diffusion Layer

The gas diffusion layer 1 contains titanium. Realization of both rigidity and gas diffusivity is more readily achieved by the gas diffusion layer 1 containing titanium as compared with a gas diffusion layer made of a carbon material. A porous material made of titanium may be used as the gas diffusion layer 1, or a porous material made of a titanium alloy may be used, for example. It is sufficient for the gas diffusion layer 1 to be porous enough to where anode gas or cathode gas can be diffused to the catalyst layer in the fuel cell, and where water generated by cell reaction can be discharged.

The porosity of the gas diffusion layer 1 containing titanium may be 40% to 75%, for example. Also, the thickness of the gas diffusion layer 1 containing titanium may be 0.1 mm or more, for example. The upper limit of this thickness is not limited in particular, but may be 0.4 mm or less, for example. The gas diffusion layer 1 containing titanium can be fabricated by sintering titanium powder, for example. The particle size of the titanium powder is not limited in particular. For example, titanium powder having a particle size of 10 μm to 75 μm may be used. Sintering conditions are not limited in particular.

The gas diffusion layer 1 may have been subjected to water-repelling treatment in advance. That is to say, the manufacturing method according to the disclosure may include subjecting the gas diffusion layer 1 to water-repelling treatment before coating the gas diffusion layer 1 with the precursor 2. The specific method of the water-repelling treatment is not limited in particular. For example, water-repelling properties may be imparted to the gas diffusion layer 1 by adhesion of a water-repellent resin on the gas diffusion layer 1. Examples of the method of adhesion of the water-repellent resin on the gas diffusion layer 1 include coating the gas diffusion layer 1 with a diffusion liquid containing water-repellent resin, and thereafter heating. The type of water-repellent resin is not limited in particular, and can be selected from those which will be described later. For example, a fluororesin such as polytetrafluoroethylene can be used.

1.2 Precursor

The precursor 2 contains electroconductive material, water-repellent resin, and a polyethylene oxide. The content ratio of the electroconductive material, the water-repellent resin, and the polyethylene oxide is not limited in particular. From the perspective of exhibiting high coatablity and ease of removal in the later heating, no less than 1 part by mass and no more than 2 parts by mass of a polyethylene oxide may be included as to 100 parts by mass of the total amount of the electroconductive material and the water-repellent resin.

1.2.1 Electroconductive Material

It is sufficient for the electroconductive material to be able to impart electroconductivity to the microporous layer 3, and the type thereof is not limited in particular. Examples of the electroconductive material include carbon particles, carbon fibers, metal particles, metal fibers, or a combination of two or more thereof. Carbon particles may be used as the electroconductive material from the perspectives of ease in handling and electroconductivity. Examples of carbon particles include carbon black, graphite, vapor-grown carbon particles, and so forth. Acetylene black is a subtype of carbon black that has particularly excellent electron conductivity, has a large specific surface area, and is highly pure.

1.2.2 Water-Repellent Resin

It is sufficient for the water-repellent resin to be able to impart water repellency to the microporous layer 3, and the type thereof is not limited in particular. Examples of the water-repellent resin include polytetrafluoroethylene (PTFE), tetrafluoroethylene-hexafluoropropylene copolymer (FEP), perfluoroalkoxy fluororesin (PFA), polychlorotrifluoroethylene (PCTFE), ethylene-tetrafluoroethylene copolymer (ETFE), ethylene chlorotrifluoroethylene copolymer (ECTFE), polyvinylidene fluoride (PVDF), and like fluororesins, silicone resins, or a combination of two or more types thereof. A fluororesin may be used from the perspective of excellent water repellency and corrosion resistance, and polytetrafluoroethylene may be used. The polytetrafluoroethylene may be a homopolymer of tetrafluoroethylene, a halogenated olefin such as chlorotrifluoroethylene or hexafluoropropylene or the like, perfluoro(alkyl vinyl ether), and other like modified polytetrafluoroethylenes including units derived from a fluorinated monomer.

1.2.3 Polyethylene Oxide

Including a polyethylene oxide in the precursor 2 improves coatablity of the precursor 2. The molecular weight of the polyethylene oxide is not limited in particular. From the perspective of exhibiting high coatablity and ease of removal in the later heating, the molecular weight of the polyethylene oxide may be in a range of no less than 250,000 to no more than 2,200,000. Such a polyethylene oxide is commercially available as, for example, Peo, manufactured by Sumitomo Seika Chemicals Co., Ltd., ALKOX, manufactured by Meisei Chemical Works, Ltd., and so forth.

1.2.4 Other Components

The precursor 2 may be a dry mixture including the electroconductive material, the water-repellent resin, and the polyethylene oxide, or may be a slurry or paste containing a solvent along with the electroconductive material, the water-repellent resin, and the polyethylene oxide. Coating is easier when the precursor 2 is a slurry or paste containing the electroconductive material, the water-repellent resin, the polyethylene oxide, and a solvent. The type of solvent is not limited in particular, and examples that can be used include water and organic solvents. The solvent can be easily removed from the precursor 2 by drying or by later-described heating.

The precursor 2 may contain some sort of additive in addition to the electroconductive material, the water-repellent resin, and the polyethylene oxide. For example, the precursor 2 may contain a dispersant along with the polyethylene oxide. Examples of such dispersants include known nonionic surfactants, nonionic dispersants, cationic dispersants, and anionic dispersants.

1.3 Coating

The manufacturing method according to the disclosure includes coating the gas diffusion layer 1 containing titanium with the precursor 2 including the electroconductive material, the water-repellent resin, and the polyethylene oxide. In the form illustrated in FIG. 2, the precursor 2 is coated on one face of the gas diffusion layer 1. The method of coating is not limited in particular. The precursor 2 including a solvent can be coated onto the gas diffusion layer 1 by trade-painter paintbrushes, artist paintbrushes, roll coaters, bar coaters, die coaters, screen printing, spraying, doctor blades, wire bars, applicators, and so forth, for example. Alternatively, a precursor 2 not containing a solvent may be deposited on the surface of the gas diffusion layer 1. The coating amount (coat thickness) of the precursor 2 on the gas diffusion layer 1 is not limited in particular, and can be adjusted as appropriate in accordance with the objective thickness of the microporous layer 3.

1.4 Heating

The manufacturing method of the disclosure includes heating the gas diffusion layer 1 that has been coated with the precursor 2, to form the microporous layer 3 containing the electroconductive material and the water-repellent resin on the surface of the gas diffusion layer 1. Heating the gas diffusion layer 1 upon which the precursor 2 is coated removes the polyethylene oxide from the precursor 2. Note that "remove" is not limited to "completely remove", and trace amounts of a polyethylene oxide and components derived from a polyethylene oxide may remain in the microporous layer 3 as impurities. When great amounts of the polyethylene oxide remain in the microporous layer 3, sufficient water repellency may not be able to be ensured for the microporous layer 3, and accordingly as much polyethylene oxide as reasonably possible is removed from the precursor 2 by heating. In the manufacturing method according to the disclosure, the atmosphere for heating here is a non-oxidation atmosphere where the oxygen concentration is no more than 0.3% by volume.

According to estimations made by the present inventor, when the oxygen concentration is high during heating, there are situations where the polyethylene oxide changes into some sort of electron conductivity inhibitor at the interface of the gas diffusion layer 1 and the precursor 2, leading to marked increase in electrical resistance (volume resistivity) at the interface of the gas diffusion layer 1 and the microporous layer 3. In contrast with this, an arrangement in which the atmosphere for heating is a non-oxidation atmosphere where the oxygen concentration is no more than 0.3% by volume, as in the manufacturing method according to the disclosure, is thought to suppress generation of the above electron conductivity inhibitor. An inert gas atmosphere where the oxygen concentration is no more than 0.3% by volume is conceivable as a specific example as a non-oxidation atmosphere. Example of inert gasses include nitrogen and argon. Alternatively, besides an inert gas atmosphere, desired effects are thought to be achievable under a reducing gas atmosphere as well. The oxygen concentration in the heating atmosphere may be no more than 0.2% by volume, may be no more than 0.1% by volume, or may be no more than 0.05% by volume. There is no particular lower limit for the oxygen concentration in the heating atmosphere, and may be 0% by volume.

The heating temperature is not limited in particular, and it is sufficient to be a temperature whereby the polyethylene oxide contained in the precursor 2 can be removed and the microporous layer 3 containing the electroconductive material and the water-repellent resin can be formed on the surface of the gas diffusion layer 1. Raising the heating temperature is advantageous in that the polyethylene oxide can easily be thermally decomposed, and the polyethylene oxide can be easily removed from the precursor 2. The oxygen concentration is no more than 0.3% by volume when heating in the manufacturing method according to the disclosure, as described above, and thermal decomposition of a polyethylene oxide occurs less readily as compared to heating under an ambient air atmosphere. Accordingly, from this perspective, the heating temperature should be as high as reasonably possible. On the other hand, lowering the heating temperature is advantageous in that deterioration of the water-repellent resin can be suppressed. According to the understanding of the present inventor, the polyethylene oxide can be removed more effectively, while enabling deterioration of the water-repellent resin to be further suppressed, when the heating temperature is no lower than 350° C. and no higher than 400° C., for example.

In the manufacturing method according to the disclosure, heating conditions other than the atmosphere and the temperature (temperature rise rate when heating, holding time at the heating temperature, temperature fall rate after heating, pressure when heating, etc.) are not limited in particular. Further, the heating means are not limited in particular, and a known heating furnace or the like may be used.

1.5 Microporous Layer

The microporous layer 3 contains the electroconductive material and the water-repellent resin. The content ratio of the electroconductive material and the water-repellent resin in the microporous layer 3 is not limited in particular. The content ratio thereof can be decided as appropriate giving consideration to the objective electroconductivity and water repellency. It is sufficient for the microporous layer 3 to be porous enough to where anode gas or cathode gas can be diffused to the catalyst layer in the fuel cell, and where water generated by cell reaction can be discharged.

As described above, the microporous layer 3 is obtained by heating the precursor 2. Although completely removing all unnecessary organic matter from the precursor 2 by heating is ideal in the manufacturing method according to the disclosure, there are cases where trace amounts of unnecessary components derived from the precursor 2 remain in reality. For example, substances from thermal decomposition of a polyethylene oxide may unavoidably exist in the microporous layer 3.

1.6 Supplement

According to the understanding of the present inventor, when a gas diffusion layer made of carbon is coated with the above-described precursor and heated under an ambient air atmosphere to perform degreasing, the electron resistance of the obtained gas diffusion layer with a microporous layer does not greatly increase. On the other hand, according to the understanding of the present inventor, coating a gas diffusion layer containing titanium with the above-described precursor and heating under an ambient air atmosphere to perform degreasing results in marked increase of the electrical resistance (volume resistivity) of the obtained gas diffusion layer with a microporous layer. The present inventor has diligently studied to solve this new issue.

The present inventor initially suspected that heating the gas diffusion layer containing titanium under an ambient air atmosphere caused the titanium to be oxidized and that an oxide layer with a high volume resistivity was formed on the surface of the gas diffusion layer. However, results of verification showed that heating the gas diffusion layer containing titanium under an ambient air atmosphere at degreasing temperature caused practically no change in the thickness of the oxide layer on the surface of the gas diffusion layer. Also, there was no great change in electron resistance of the gas diffusion layer between a case where just the gas diffusion layer containing titanium was heated under an ambient air atmosphere and a case where heated under a nitrogen atmosphere. A powerful oxide film had already been formed on the surface of the gas diffusion layer containing titanium before heating. Therefore, it can be said that a further oxide layer is not formed even if the gas diffusion layer is heated at a level at degreasing temperature under an ambient air atmosphere. Thus, the volume resistivity does not increase.

The present inventor thought that when heating the gas diffusion layer coated with the precursor, the titanium (or titanium oxides) contained in the gas diffusion layer was exhibiting catalytic effects where the polyethylene oxide contained in the precursor was reacting with oxygen, thereby generating some sort of electron conductivity inhibitor. In this case, when heating the gas diffusion layer coated with the precursor, removing the oxygen that causes the oxidation reaction can suppress generation of the electron conductivity inhibitor. Results of verification showed that suppressing the oxygen concentration when heating to no more than 0.3% by volume was able to markedly reduce the volume resistivity of the gas diffusion layer with the microporous layer.

Alternatively, a scenario can be conceived where suppressing the oxygen concentration when heating to no more than 0.3% by volume caused the polyethylene oxide to be converted into electroconductive soot by thermal decomposition, thereby suppressing increased volume resistivity of the gas diffusion layer with the microporous layer.

As described above, according to the manufacturing method of the disclosure, increase in volume resistivity when providing the microporous layer 3 on the surface of the gas diffusion layer 1 containing titanium can be suppressed as compared to conventional arrangements.

2. Manufacturing Method of Fuel Cell

Figure 3:
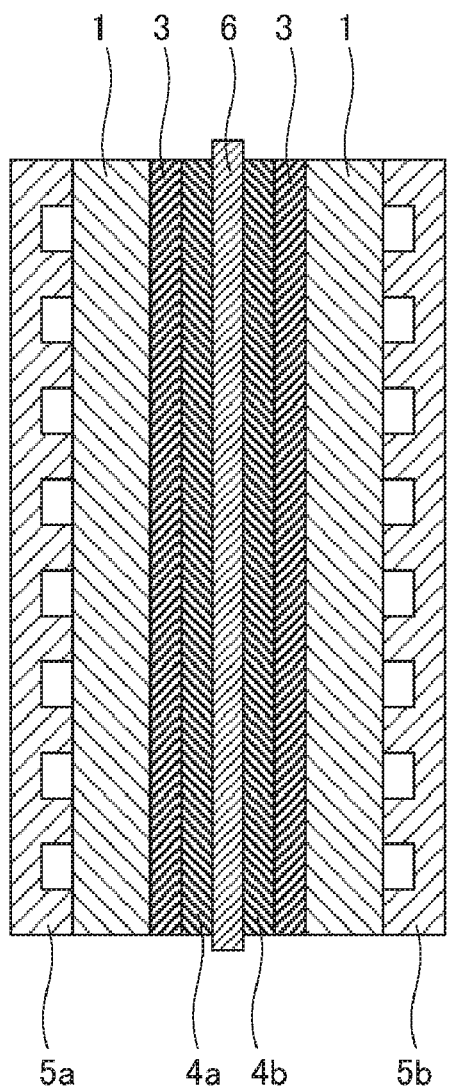
FIG. 3 is a diagram for describing an example of a configuration of a fuel cell.

The technology of the disclosure also has an aspect as a manufacturing method of a fuel cell. FIG. 3 illustrates an example of a configuration of a fuel cell. The manufacturing method of the fuel cell according to the disclosure includes providing catalyst layers 4 (4a, 4b) to the microporous layer 3 side of the gas diffusion layer with the microporous layer manufactured by the manufacturing method according to the disclosure, and providing separators 5 (5a, 5b) on the gas diffusion layer 1 side of the gas diffusion layer with the microporous layer, as illustrated in FIG. 3. For example, on one side of a electrolyte membrane 6, the electrolyte membrane 6, an anode catalyst layer 4a, the microporous layer 3, the gas diffusion layer 1, and the separator 5a are disposed in that order, and on the other side of the electrolyte membrane 6, the electrolyte membrane 6, a cathode catalyst layer 4b, the microporous layer 3, the gas diffusion layer 1, and the separator 5b are disposed in that order, as illustrated in FIG. 3. Although the form illustrated in FIG. 3 has the gas diffusion layer with the microporous layer according to the disclosure disposed on both the anode side and the cathode side, an arrangement may be made where the gas diffusion layer with the microporous layer according to the disclosure is disposed only on one of the anode side and the cathode side. The manufacturing method of the fuel cell according to the disclosure may be the same as with conventional arrangements other than using the gas diffusion layer with the microporous layer according to the disclosure. The configurations of the catalyst layers 4, the separators 5, and the electrolyte membrane 6 are obvious, and accordingly further description thereof will be omitted here.

The manufacturing method of the gas diffusion layer with the microporous layer according to the disclosure will be described in detail below by way of examples. It should be noted, however, that the manufacturing method of the disclosure is not limited to the following examples.

1. Fabrication Conditions and Evaluation Conditions of Gas Diffusion Layer with Microporous Layer

1.1 Comparative Example 1

WEBTi-T, manufactured by Toho Titanium Co., Ltd., was rolled to obtain a titanium porous material approximately 150 μm thick. This titanium porous material was used as the gas diffusion layer.

A commercially-available PTFE diffusion liquid was diluted, and water-repelling treatment of the titanium porous material was performed by coating of the diluted diffusion liquid onto the titanium porous material, and thereafter heating, so that PTFE, adhered to the surface of the titanium porous material.

An MPL solution manufactured by Aisin Chemical Co., Ltd. (containing acetylene black as the electroconductive material, PTFE as the water-repellent resin, a polyethylene oxide as the dispersant, and water as the solvent) was used as the precursor. After water-repelling treatment, the titanium porous material was coated with the precursor to a thickness of 80 μm using a bar coater.

The titanium porous material coated with the precursor was heated at 350° C. under an ambient air atmosphere to remove the polyethylene oxide contained in the precursor, thereby forming a microporous layer on the surface of the titanium porous material.

The fabricated titanium porous material with the microporous layer was sandwiched between gold-plated copper, current of 1 A was applied under a state of surface pressure of 0.8 MPa, and the voltage at this time was measured. The volume resistivity of the titanium porous material with the microporous layer was measured from the relation between current and voltage.

1.2 Example 1

A titanium porous material with the microporous layer was fabricated in the same way as with the comparative example, 1, except for forming the microporous layer on the surface of the titanium porous material by heating the titanium porous material coated with the precursor at 350° C. under a nitrogen atmosphere with an oxygen concentration of 0.3% by volume to remove the polyethylene oxide contained in the precursor, and the volume resistivity was measured.

1.3 Example 2

A titanium porous material with the microporous layer was fabricated in the same way as with the comparative example, 1, except for forming the microporous layer on the surface of the titanium porous material by heating the titanium porous material coated with the precursor at 350° C. under a nitrogen atmosphere with an oxygen concentration of 0.05% by volume to remove the polyethylene oxide contained in the precursor, and the volume resistivity was measured.

1.4 Example 3

A titanium porous material with the microporous layer was fabricated in the same way as with the comparative example, 1, except for forming the microporous layer on the surface of the titanium porous material by heating the titanium porous material coated with the precursor at 400° C. under a nitrogen atmosphere with an oxygen concentration of 0.05% by volume to remove the polyethylene oxide contained in the precursor, and the volume resistivity was measured.

1.5 Example 4

A titanium porous material with the microporous layer was fabricated in the same way as with the comparative example, 1, except for forming the microporous layer on the surface of the titanium porous material with the thickness of coating the precursor being 50 μm, and heating the titanium porous material coated with the precursor at 350° C. under a nitrogen atmosphere with an oxygen concentration of 0.05% by volume to remove the polyethylene oxide contained in the precursor, and the volume resistivity was measured.

1.6 Reference Example 1

Water-repelling treatment of the titanium porous material was performed by heating at 350° C. under an ambient air atmosphere. Thereafter, the volume resistivity was measured without providing the microporous layer to the titanium porous material.

1.7 Reference Example 2

Water-repelling treatment of the titanium porous material was performed by heating at 350° C. under a nitrogen atmosphere with an oxygen concentration of 0.3% by volume. Thereafter, the volume resistivity was measured without providing the microporous layer to the titanium porous material.

1.8 Reference Example 3

The volume resistivity of the titanium porous material was measured before subjecting to water-repelling treatment.

2. Evaluation Results

Measured values of volume resistivity are shown in Table 1 below and in FIG. 4.

TABLE 1

| | Heating conditions | | | |
|---|---|---|---|---|
| | Coating thickness (μm) | Atmosphere gas | Oxygen concentration (%) | Heating temperature | Volume resistivity (mΩ·cm$^2$) |
| Comparative example 1 | 80 | Air | 21 | 350 | 2851 |
| Example 1 | 80 | Nitrogen | 0.3 | 350 | 386 |
| Example 2 | 80 | Nitrogen | 0.05 | 350 | 92 |
| Example 3 | 80 | Nitrogen | 0.05 | 400 | 28 |
| Example 4 | 50 | Nitrogen | 0.05 | 350 | 87 |
| Reference example 1 | Titanium porous material (with water repellency treatment, heated in air atmosphere) | | | | 23 |
| Reference example 2 | Titanium porous material (with water repellency treatment, heated in nitrogen atmosphere with 0.3% oxygen concentration) | | | | 25 |
| Reference example 3 | Titanium porous material (no water repellency treatment, no heating) | | | | 13 |

Figure 4:
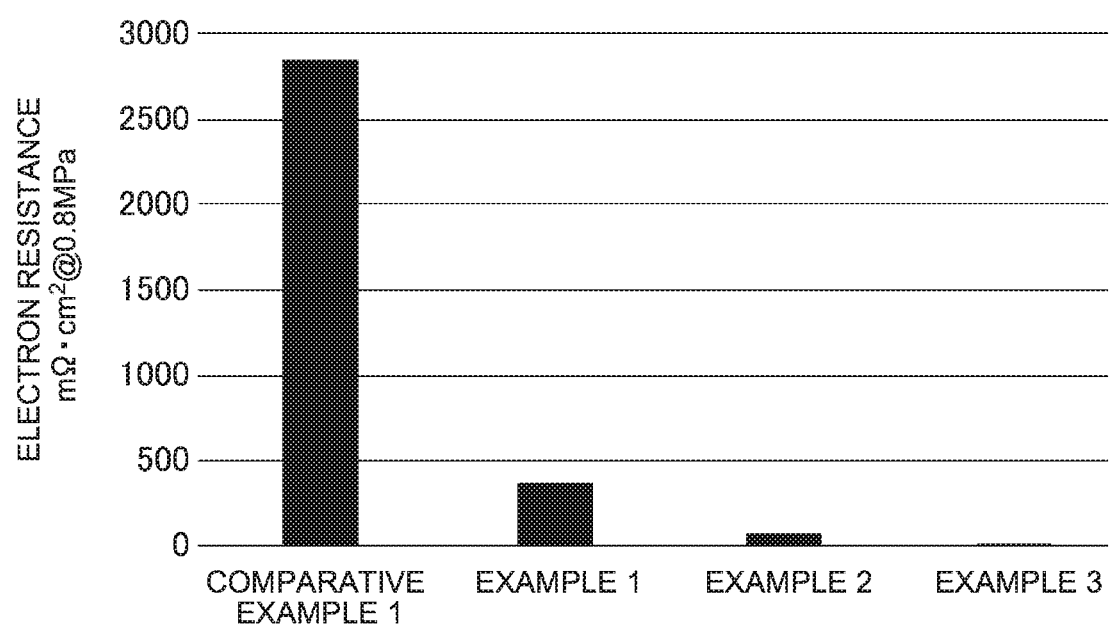
FIG. 4 is a diagram comparing volume resistivity of examples with volume resistivity of a comparative example.

The volume resistivity of the gas diffusion layers with the microporous layer in Examples 1 through 3 decreased markedly as compared to Comparative example 1, as shown in Table 1 and FIG. 4. It can also be seen by comparing Example 2 and Example 3 that the volume resistivity of the gas diffusion layer with the microporous layer markedly decreases even further when the heating temperature for providing the microporous layer is 400° C. as compared to when 350° C. It can also be seen by comparing Example 2 and Example 4 that the coating thickness of the precursor (i.e., the thickness of the microporous layer) hardly has any effect on the volume resistivity of the gas diffusion layers with the microporous layer.

It can also be seen by comparing Reference example 1 and Reference example 2 that there is hardly any difference in the volume resistivity between heating the titanium porous material that has been subjected to water-repelling treatment under an ambient air atmosphere and heating under a nitrogen atmosphere. That is to say, heating the titanium porous material under an ambient air atmosphere at a degreasing temperature hardly causes any oxidization of titanium, and there is hardly any increase in volume resistivity, either.

Figure 5:
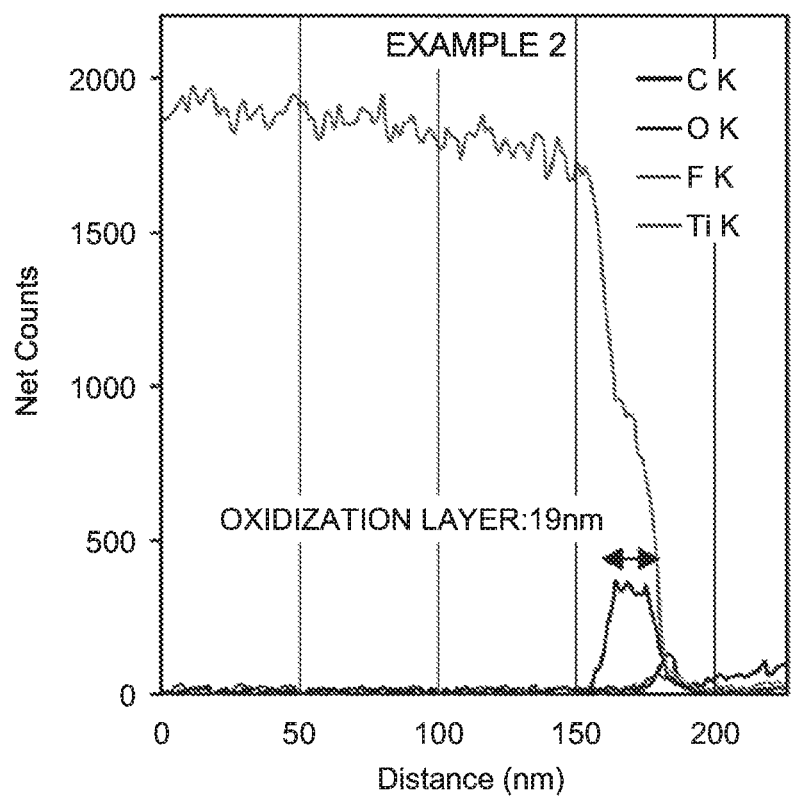
FIG. 5 is a diagram for describing the relation between volume resistivity and the thickness of an oxide film.
Figure 5:
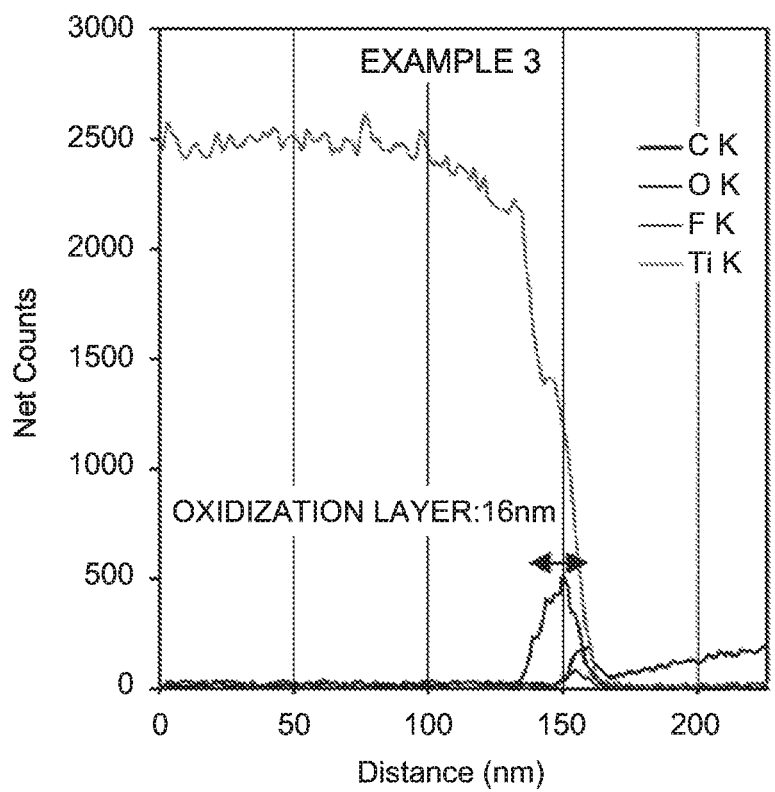

A scanning transmission electron microscope (STEM) was used to perform element analysis in a microregion at the interface of the titanium porous material and the microporous layer, and the thickness of an oxide layer on the surface of the titanium porous material was measured, with regard to Example 2 and Example 3. A width where oxygen concentration is half the peak value was recognized as an oxidization layer. The results are shown in FIG. 5. While there is difference in volume resistivity between Example 2 and Example 3 as shown in Table 1 above, the thicknesses of the oxidization layers on the surface of the titanium are equivalent between Example 2 and Example 3, as illustrated in FIG. 5. That is to say, oxidization of titanium is not the primary factor contributing to the increase in volume resistivity.

While the thicknesses of coating with the precursor differs between Example 2 and Example 4, the volume resistivities are equivalent. That is to say, it is conceivable that the bulk resistance of the microporous layer is not the primary factor contributing to the increase in volume resistivity. It thus is conceivable that there is marked change in volume resistivity due to interfacial resistance at the interface of the titanium porous material and the microporous layer.

The following estimation mechanism can be established from the above results. That is to say, it is conceivable that when the titanium porous material coated with the precursor is heated in air, the titanium (or a titanium oxide) acts catalytically to cause the polyethylene oxide contained in the precursor and oxygen to react, thereby generating some sort of electron conductivity inhibitor at the interface of the titanium porous material and the precursor. On the other hand, it is conceivable that suppressing the oxygen concentration at the time of heating to no more than 0.3% by volume suppresses generation of this electron conductivity inhibitor, thereby markedly reducing the volume resistivity of the gas diffusion layer with the microporous layer.

Alternatively, it is conceivable that suppressing the oxygen concentration when heating to no more than 0.3% by volume caused the polyethylene oxide to be converted into electroconductive soot by thermal decomposition, thereby suppressing increased volume resistivity of the gas diffusion layer with the microporous layer.

A form has been exemplified in the above examples where the titanium porous material is subjected to water-repelling treatment using a PTFE diffusion liquid beforehand. However, the manufacturing method according to the disclosure is not limited to this form. As it is conceivable that the above issue of increase in volume resistivity will occur even when a water-repellent resin other than PTFE is used, it is conceivable that this problem can be solved by employing the manufacturing method according to the disclosure, yielding the desired effects thereof. Also, as it is conceivable that the above issue of increase in volume resistivity will occur even when water-repelling treatment is not performed, it is conceivable that this problem can be solved by employing the manufacturing method according to the disclosure, yielding the desired effects thereof.

Also, a form where acetylene black was used as the electroconductive material and was used PTFE as the water-repellent resin in the microporous layer has been exemplified in the above examples. However, the manufacturing method according to the disclosure is not limited to this form. It is conceivable from the above estimation mechanism that the problem can be solved regardless of the type of electroconductive material and water-repellent resin.

Further, while the heating temperature is 350° C. or 400° C. in the above examples, the heating temperature in the manufacturing method according to the disclosure is not limited to these. The polyethylene oxide contained in the precursor can be removed and the microporous layer containing the electroconductive material and water-repellent resin can be formed on the surface of the gas diffusion layer at other temperatures as well. It should be noted however, that the polyethylene oxide can be removed more effectively, while further suppressing deterioration of the water-repellent resin, when the heating temperature is no lower than 350° C. and no higher than 400° C.

What is claimed is:

1. A manufacturing method of a gas diffusion layer with a microporous layer, the method comprising:
    coating the gas diffusion layer containing titanium with a precursor containing an electroconductive material, a water-repellent resin, and a polyethylene oxide; and
    heating the gas diffusion layer coated with the precursor in a non-oxidation atmosphere where an oxygen concentration is no more than 0.3% by volume to form the microporous layer containing the electroconductive material and the water-repellent resin on a surface of the gas diffusion layer.

2. The manufacturing method according to claim 1, wherein a heating temperature is no lower than 350° C. and no higher than 400° C.

3. The manufacturing method according to claim 1, wherein the non-oxidation atmosphere is an inert gas atmosphere where the oxygen concentration is no more than 0.3% by volume.

4. The manufacturing method according to claim 1, further comprising:
    subjecting the gas diffusion layer to water-repelling treatment, prior to coating the gas diffusion layer with the precursor.

5. The manufacturing method according to claim 1, wherein the non-oxidation atmosphere has an oxygen content of from 0.05% oxygen by volume to 0.3% oxygen by volume.

6. The manufacturing method according to claim 1, wherein the porosity of the gas diffusion layer containing titanium is from 40% to 75%.

7. The manufacturing method according to claim 1, wherein the thickness of the gas diffusion layer containing titanium is from 0.1 mm to 0.4 mm.

8. The manufacturing method according to claim 1, wherein the gas diffusion layer containing titanium includes a sintered titanium powder.

9. The manufacturing method according to claim 8, wherein the titanium powder has a particle size ranging from 10 μm to 75 μm.

10. The manufacturing method according to claim 1, wherein the precursor contains no less than 1 part by mass and no more than 2 parts by mass of the polyethylene oxide per 100 parts by mass of the total amount of the electroconductive material and the water-repellent resin.

11. The manufacturing method according to claim 1, wherein the gas diffusion layer containing titanium has an oxide layer.

12. A manufacturing method of a fuel cell, the method comprising:
    disposing a catalyst layer on a microporous layer side of the gas diffusion layer with the microporous layer manufactured by the manufacturing method according to claim 1; and
    disposing a separator on a gas diffusion layer side of the gas diffusion layer with the microporous layer.

* * * * *